E. H. ANGIER.
BALE.
APPLICATION FILED OCT. 31, 1917.

1,367,650.

Patented Feb. 8, 1921.

Inventor:
Edward H. Angier,
by Emery, Booth, Janney & Varney
Attys.

UNITED STATES PATENT OFFICE.

EDWARD H. ANGIER, OF FRAMINGHAM, MASSACHUSETTS.

BALE.

1,367,650.  Specification of Letters Patent.  Patented Feb. 8, 1921.

Application filed October 31, 1917. Serial No. 199,598.

*To all whom it may concern:*

Be it known that I, EDWARD H. ANGIER, a citizen of the United States, and resident of Framingham, in the county of Middlesex and Commonwealth of Massachusetts, have invented an Improvement in Bales, of which the following description, in connection with the accompanying drawing, is a specification, like characters on the drawings representing like parts.

This invention relates to packages and is designed to provide as a unit for storage or shipment a commodity or commodities in a resistant inclosing covering. The particular package shown in the drawing as an example of my invention is of such form that it might aptly be called a bale and for convenience I shall in the following description use the word "bale" referring both to the inclosed commodities and to the covering or wrapping. The word bale, however, is commonly understood as implying a mass of more or less agglomerated material. While I anticipate a marked field of usefulness for my invention in connection with baled material, for example packages of clothing, I wish to emphasize the fact that my use of the word here is for convenience and by way of example and that single articles or numbers of articles each of which would have a permanent form of its own might be inclosed by the wrapping.

My invention will best be understood by reference to the following description taken in connection with the accompanying drawing wherein:—

Figure 2:
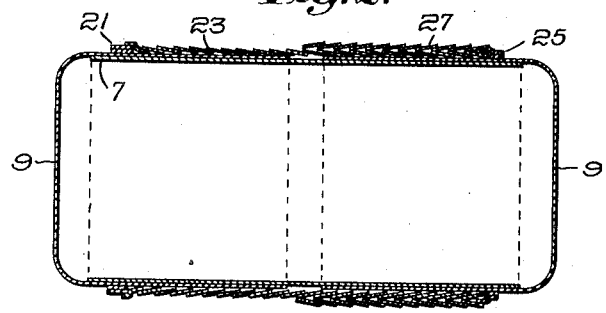
Fig. 2 is a section on line 2—2 of Fig. 1. In order to avoid complication the material in the wrapping is not shown by this figure.

Referring to the drawing, I have there illustrated as an example of my invention such a bale as might be formed from a quantity of clothing and having a generally parallelopipedal form with more or less rounded edges and corners. The material, as seen in Fig. 2, is preferably encircled with a wrapping sheet 7 which will serve as a bale tie, holding the material temporarily in form and also protecting it from damage during the wrapping process next to be described. Wrapping material 9, herein in the form of sheets, is applied to the ends of the bale and these sheets may be folded inwardly over the sides. To effect this they are preferably box-plaited at the corners as illustrated in Fig. 3, since this will permit the paper to be drawn tightly and without wrinkles across the sides of the bale and will attain other incidental advantages hereafter to be described.

Figure 3:
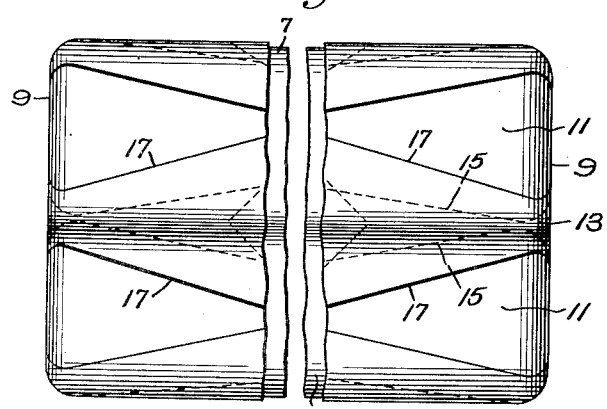
Fig. 3 is an enlarged view, partly broken away, of the bale before the application of the helical wrapping strip and viewed from one edge.

The construction of these box plaits will be more clear from Fig. 3 in which the bale is viewed from one corner. The sheet is folded inwardly and spread over the sides of the bale at 11 and pressed toward the corner 13, providing folds along the dotted lines 15, these folds opening away from the corner, and other folds along the lines 17 opening inwardly toward the corner. The corner of the wrapping sheet which lies centrally of the plait appears on the opposite side of the broken away portion in the figure. By utilizing this form of fold perfect smoothness of the parts 11 is assured and a reinforcement of superimposed layers of paper is provided at the vulnerable edge of the bale.

As seen in Figs. 2 and 3, the size of these end coverings may be such that coöperatively they almost inclose the bale, and the extended portions provided by the corners of the sheets where plaited may even overlap as indicated in Fig. 3. This construction, however, is not essential.

Figure 1:
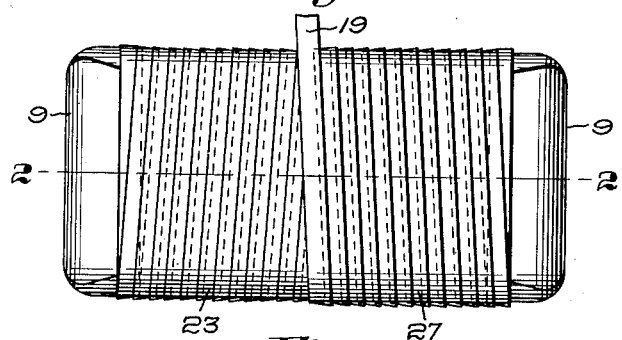
Figure 1 is a side elevation of the bale not quite completely wrapped.

To complete the package the bale is encircled between its ends by wrapping material covering the body portion thereof and binding down the inturned parts of the sheets 9. Preferably this wrapping takes the form of a narrow wrapping strip 19 applied in a plurality of helical convolutions and in any desired number of layers. Referring particularly to Figs. 2 and 3, I will next describe the way in which this wrapping strip is applied in the example shown. In the form illustrated the wrapping of the strip 19 is commenced at the left hand, viewing Fig. 2, and preferably several superimposed or closely adjacent turns 21 are first provided in order to bind down securely the sheet 9. The wrapping strip is then continued with a proper pitch to provide helical turns 23 overlapping one another, and this helical wrapping is drawn tightly and smoothly about the bale until the other end of the same is reached, where superimposed turns 25 may be provided to bind down the parts about the right hand sheet 9. If it is desired to apply more than one thickness of wrapping to the bale, the strip 19 may be again helically wrapped with opposite pitch back toward the left hand end of the bale, the convolutions in the drawing being marked 27. In Figs. 1 and 2 this second layer has not yet been completed, the purpose of illustrating the bale in this way being to show clearly the first set of convolutions 23. This layer may be finished off, if desired, by superimposed turns similar to the turns 21 and 25 and of course the wrapping can be continued to provide any desired number of layers.

Figure 4:
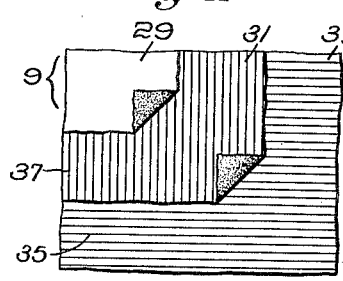
Fig. 4 is a detail illustrating the preferred construction for the sheets covering the ends of the bale.

The bale which I have described is designed to be resistant to shocks and also to be thoroughly weather proof. While these results would be attained to a degree with ordinary paper or similar material, I prefer to form the bale with the materials and by the method which I will next more particularly describe. The two end sheets 9 are of a suitable strong and waterproof material and may conveniently be formed as shown in detail in Fig. 4. As appears from that figure, the sheet 9 is formed from three separate sheets of paper—29, 31 and 33. Between the sheets 31 and 33 are provided reinforcing threads 35 which are embedded in a waterproof adhesive layer which cements together the two sheets. This waterproof adhesive is preferably pitch or bitumen and is indicated on the turned back corner of the sheet 31. Similar adhesive is interposed between sheets 29 and 31 and reinforcing threads 37 are embedded in this material, the threads 37 being applied in a direction crossing that of the threads 35. This laminated structure is exceedingly strong, flexible and thoroughly waterproof.

Figure 5:
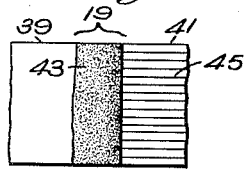
Fig. 5 is a detail illustrating the preferred form of wrapping material used for the body wrapping.

In Fig. 5 I have shown the preferred material for use as the wrapping strip 19. It comprises two layers of paper 39 and 41 having an interposed layer of bitumen or pitch 43 in which are embedded longitudinal reinforcing threads 45. This material is similar to that described in my Patent No. 1,167,466.

As the strip 19 is applied about the bale it is preferably smeared with suitable waterproof adhesive, such as asphalt. The various turns thereof adhere together and to the end sheets 29 and when the adhesive dries they form a resistant and waterproof shell, all the turns being as it were fused into a single covering which closely fits the article about which it is applied and in fact is constructed exactly to conform to the shape of that article, so that it might aptly be compared to a skin or bark about the same, forming an integument or cortical covering.

Particular advantages are found in the construction which I have just described. By utilizing the helical wrapping it is possible to adapt the covering to the form of many commodities and to draw it perfectly tight and without wrinkles about the same. Furthermore, it is possible to treat the strip with waterproof adhesive without undue inconvenience and without causing stretching and buckling thereof as would be the case if it were attempted to smear or impregnate a large sheet for a similar purpose. In particular, in a construction such as that illustrated the wrapping sheets 9 may be firmly applied about the ends of the article and bound down by the helical wrapping into a perfectly smooth and tight covering. On account of the nature of the materials used and the method of applying them by the use of adhesive which cements, or so to speak, agglomerates all into a single unitary mass, a thoroughly weatherproof package is provided and also one which it is exceedingly difficult to break or pierce and which is consequently well adapted for heavy handling or shipment. The bale may therefore be shipped great distances and may be stored in the open without injury to the contents. A further advantage is that under the present railway classification it would receive favorable treatment in the matter of rates.

Having described a single illustrative embodiment of my invention, the principles embodied therein and which I claim as new I shall embody in the following claims:—

1. A bale having sheets at the ends thereof infolded along the sides and a wrapping of strip material encircling the bale in a plurality of overlapping helical convolutions covering the central portion of the bale and inclosing the edges of said sheets.

2. A bale as defined in claim 1 wherein the strip forms a plurality of layers, adjacent layers being of opposite pitch.

3. A bale as defined in claim 1 wherein the edges of the sheets are bound down by repeated, closely arranged turns of the strip.

4. A package having end wrappings presenting opposed edges between the ends thereof and strip material wrapped about the contents of the package between the ends and about said edges in overlapping helical convolutions.

5. A package having waterproof wrapping material applied to the ends thereof and extending over the sides and wrapping encircling the article and inclosing the same and the extending portions of said material, said wrapping being treated with waterproof adhesive, the several portions of said wrapping adhering together and to said ends and forming a resistant inclosing shell for the article closely fitted thereto and conforming to the shape thereof.

6. A sealed package comprising an article and an inclosing covering therefor comprising helically applied strip material the respective parts of which are rendered coherent by a waterproof adhesive and which forms a molded shell closely conforming to the shape of the article.

7. A bale of somewhat angular section having sheets applied to the ends thereof and infolded over the sides thereof by a set of box plaits formed at the longitudinal edges of the bale and other wrapping material encircling the bale between its ends and inclosing the edges of said end sheets.

8. A bale of somewhat angular section having waterproof sheets applied to the ends thereof and infolded over the sides thereof by a set of box plaits formed at the longitudinal edges of the bale and other wrapping material providing a waterproof side covering encircling the bale between its ends, inclosing the edges of said end sheets and the open ends of said plaits and sealed thereto to provide a sealed inclosing covering for the bale.

9. A bale having waterproof sheets applied to the ends and infolded over the sides thereof and waterproof strip material helically encircling the bale in a plurality of mutually adhering convolutions, providing an encircling covering for the bale inclosing the edges of said sheets and adhering thereto to provide a sealed package.

10. A method of packaging characterized by encircling the thing to be packed with strip material treated with waterproof adhesive applied in overlapping helical convolutions to provide a desired number of thicknesses whereby on drying a cortical covering is provided.

11. A method of packaging characterized by applying coverings to the ends of the article having portions extending over the sides thereof and encircling the article between said ends and said extending portions with strip material treated with waterproof adhesive applied in overlapping helical convolutions.

12. A sealed package comprising an article and a covering therefor of helically applied strip material which is treated in its entirety with adhesive and whereof the various parts are sealed together with said adhesive to provide a molded shell conforming to the shape of the article.

13. The method of packaging material comprising forming the same in a mass, holding the same compressed by a sheet encircling the same between its ends, applying end wrappings and inclosing the middle portion of the mass with turns of wrapping material treated with adhesive.

14. The method of packaging material comprising forming the same in a mass, holding the same compressed by a sheet encircling the same between its ends, applying end wrappings and inclosing the middle portion of the mass with lapping helical turns of strip material treated with adhesive.

15. A method of packaging things which comprises building up a protecting layer about the thing closely conforming to the shape thereof by winding narrow strip wrapping material thereabout to form a plurality of layers each comprising helical turns, the turns of adjacent layers being of opposite pitch, and binding said layers together with adhesive.

In testimony whereof, I have signed my name to this specification.

EDWARD H. ANGIER.